United States Patent

[11] 3,629,491

[72] Inventors Bert H. Dann
Mountain View;
Floyd M. Gardner, Reseda, both of Calif.

[21] Appl. No. 873,416
[22] Filed Nov. 3, 1969
[45] Patented Dec. 21, 1971
[73] Assignee Bell & Howell Company
Chicago, Ill.

[54] SIGNAL-CORRECTING APPARATUS
7 Claims, 1 Drawing Fig.

[52] U.S. Cl. .......... 178/5.4 CD, 178/5.2 R, 179/100.2 S
[51] Int. Cl. .......... H04n 9/02, H04n 5/78
[50] Field of Search .......... 178/5.4 CD, 6.6 P, 6.7, 6.6 A, 69.5 CB, 5.2 R; 179/100.2 M, 100.2 S

[56] References Cited

UNITED STATES PATENTS

| | | | |
|---|---|---|---|
| 3,017,462 | 1/1962 | Clark et al. .......... | 178/6.6 |
| 3,018,324 | 1/1962 | Leyton et al. .......... | 178/5.4 |
| 3,433,903 | 3/1969 | Murray et al. .......... | 179/100.2 |
| 3,488,452 | 1/1970 | Gunning et al. .......... | 179/100.2 |

OTHER REFERENCES

Proceedings, IRE, " Color Carrier Reference Phase Synchronization Accuracy in NTSC Color Television" pp. 115- 118, Richman, Jan. 1954.

*Primary Examiner*—Richard Murray
*Assistant Examiner*—P. M. Pecori
*Attorney*—Luc P. Benoit

ABSTRACT: Apparatus for providing a reference signal varying in phase in accordance with angular errors in a color video signal accompanied by a horizontal synchronization signal and by a color reference burst including a number of undesired sideband components stemming from a keying of the color reference burst at horizontal synchronization rate. The apparatus comprises a controlled oscillator for providing an output signal and for varying the phase of such output signal. The apparatus further includes a control loop for limiting frequency variations of this output signal to a range located between upper sideband components and lower sideband components of the number of undesired sideband components of the color reference burst, and a further control loop for causing the defined controlled oscillator to vary the phase of the above-mentioned output signal within the defined range in accordance with said angular errors, whereby such output signal provides the initially mentioned reference signal.

PATENTED DEC 21 1971 3,629,491
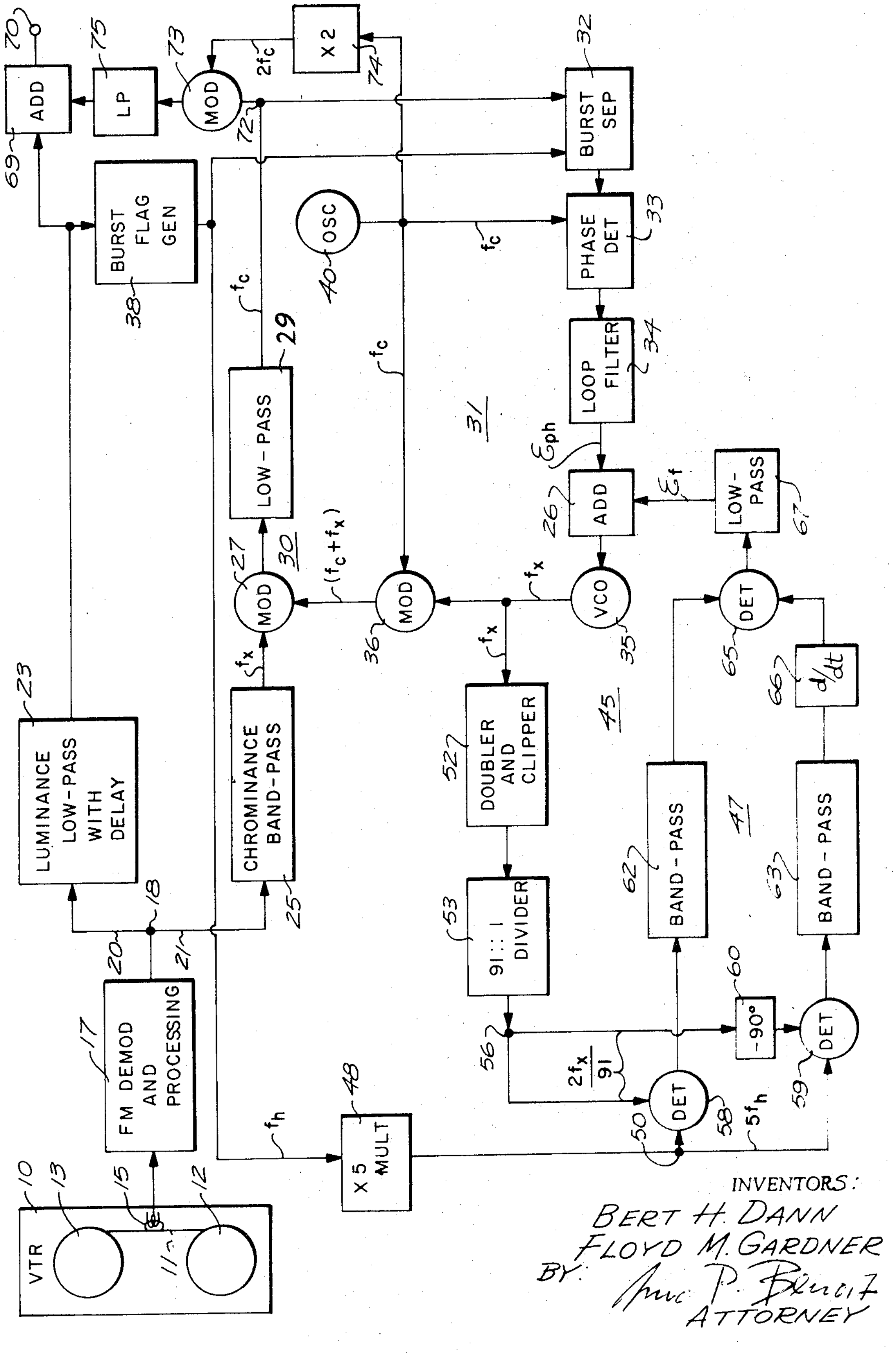
INVENTORS:
BERT H. DANN
FLOYD M. GARDNER
BY: [signature]
ATTORNEY

SIGNAL-CORRECTING APPARATUS

CROSS-REFERENCES TO RELATED APPLICATIONS

U.S. Pat. application Ser. No. 872,847, "Signal Correcting Apparatus," filed Oct. 31, 1969, by Bert H. Dann, and assigned to the subject assignee;

U.S. Pat. application Ser. No. 872,848, "Apparatus for Correcting Angular Errors in Color Video Signals with Modulators," filed Oct. 31, 1969, by Bert H. Dann, and assigned to the subject assignee;

U.S. Pat. application Ser. No. 873,284, "Signal Correcting Apparatus," filed Nov. 3, 1969, by Bert H. Dann, and assigned to the subject assignee;

U.S. Pat. application Ser. No. 56,787, "Signal Correcting Apparatus," filed July 21, 1970, by Bert H. Dann, and assigned to the subject assignee.

BACKGROUND OF THE INVENTION

1. Field of the Invention

The subject invention relates to signal-processing systems and, more particularly, to apparatus for correcting effects of angular errors in color video signals.

2. Description of the Prior Art

By way of summary, a composite color video signal comprises a luminance component and a chrominance component. The latter includes phase and amplitude modulated components disposed about a suppressed subcarrier which, in the NTSC system, nominally oscillates at 455 times half-line frequency or at approximately 3.58 MHz. In certain low-cost industrial systems, the latter half-line frequency factor is not necessarily observed, although the nominal line-scan and color-subcarrier frequencies correspond very closely to those of the NTSC system.

If a composite color video signal is recorded on and reproduced from magnetic tape, to name an example, factors such as flutter and wow in the recording and playback processes, tape shrinking and elongation, and head-to-tape spacing irregularities produce angular variations in the reproduced video signal.

Such angular errors in the luminance component are generally tolerated by the eye, particularly if they are kept within sensible limits by the use of adequate recording and playback machines. By contrast, the above-mentioned nature of the chrominance component makes this component particularly vulnerable to angular errors, as is easily seen from the fact that the phase-modulated component in the chrominance signal contains color hue information and that the eye is particularly sensitive to hue aberrations. Moreover, a shift in average frequency in the color reference carrier rate of the played-back video signal of typically more than about ±100 to 200 Hz. exceeds the pull-in range of the color reference synchronization circuits of typical color monitors or color television receivers employed for viewing the played-back signal. This at least results in a complete random display of colors. In the vast majority of color television receiving sets, no color at all will, however, be displayed since the lack of color reference synchronization prevents the conventionally employed chroma gating or "color killer" circuits from enabling the color circuits of the set.

In an effort to counter these detrimental effects, a system has been proposed in which the degraded chrominance portion of the played-back video signal is decoded into separate color components by means of a reference signal which reflects angular errors in the video signal and which is either derived from one or more pilot signals recorded and reproduced with the video signal or from the color synchronized signal or "color bursts" contained in the played-back chroma signal.

Effects of angular errors are corrected in the decoded color components because of the fact that the decoding reference signal is affected with practically the same angular errors as the played-back chrominance signal.

A different approach is apparent from another proposal according to which the played-back color signal is subjected to heterodyning operations which involve the use of a locally produced stable reference signal and of a variable reference signal which reflects angular errors in the played-back color signal.

All of these proposals presuppose the availability of a reference signal the phase of which varies in accordance with the above-mentioned angular errors relative to a substantially stable frequency, which preferably corresponds to the nominal chrominance subcarrier frequency of about 3.58 MHz.

In practice, there are however serious obstacles to the provision of such a reference signal, as will be best understood if the assumption is made that information on the angular errors in the color video signal is derived from the color synchronization signal or the "color bursts" present therein. The nature and purpose of such color bursts are well known in the color television art.

The obstacles alluded to above arise primarily from the fact that the color burst represents a carrier frequency which is ordinarily suppressed, but is keyed on for short intervals at the horizontal synchronization rate. Also, burst information is derived from the video signal by means which are gated in response to such horizontal synchronization signals. In brief, this introduces undesired sideband components in the derived burst signal which assume values of $(f_b+f_h)$, $(f_b+2f_h)$, etc., and $(f_b-f_h)$, $(f_b-2f_h)$, etc., wherein $f_b$ is the color burst frequency, while $f_h$ is the horizontal or line sweep frequency.

In the NTSC system, the nominal value of the color burst frequency is approximately 3.58 MHz, while the line sweep frequency is only 15.75 kHz., so that the undesired sidebands under consideration are difficult to separate from the desired color burst information in cases where, as here, the color bursts are afflicted with angular errors which are to be correctly derived in the preparation of the desired reference signal. Also, if the above-mentioned reference signal is produced with the aid of a voltage-controlled oscillator, the danger arises that such oscillator will lock in on an undesired sideband component. Moreover, an automatic frequency control is required for slow and stop-motion operation of video tape playback processes.

SUMMARY OF THE INVENTION

The subject invention presents a solution to the above-mentioned problems.

Briefly, the invention provides apparatus for generating a reference signal varying in phase in accordance with angular errors in a color video signal accompanied by a color reference burst and a horizontal synchronization signal; the color reference burst includes a number of sideband components stemming from a keying of the color reference burst at horizontal synchronization rate. According to the invention, this apparatus comprises, in combination, first means for providing an output signal and for varying the phase of said output signal, second means connected to the first means for limiting frequency variations of the mentioned output signal to a range located between upper sideband components and lower sideband components of said number of sideband components of the color reference burst, and third means connected to the first means for causing such first means to vary the phase of its output signal within the defined range in accordance with the above-mentioned angular errors, whereby such output signal provides the initially mentioned reference signal.

From another aspect thereof, the invention provides apparatus for generating a reference signal varying in phase in accordance with angular errors in a color video signal accompanied by a color reference burst and a horizontal synchronization signal. The color reference burst includes a number of sideband components stemming from a keying of the color reference burst at horizontal synchronization rate.

According to the invention, this apparatus comprises, in combination, first means for providing an output signal and for varying the phase of such output signal, second means for deriving from said horizontal synchronization signal a signal indicative of the horizontal synchronization rate, and frequency control loop means including the first means just defined and being connected to the second means for limiting in response to said output signal and the horizontal synchronization rate signal, frequency variations of such output signal to a range located between upper sideband components and lower sideband components of said number of sideband components of the color reference burst, and phase-lock loop means including the above-mentioned first means for causing such first means to vary the phase of its output signal within the latter range in accordance with the above-mentioned angular errors, whereby such output signal provides the initially mentioned reference signal.

BRIEF DESCRIPTION OF THE DRAWING

The invention will become more readily apparent from the following detailed description of a preferred embodiment thereof, illustrated by way of example in the accompanying drawing, which is a block diagram of a video signal processing apparatus.

DESCRIPTION OF THE PREFERRED EMBODIMENTS

FIG. 1 symbolically shows a video tape recording apparatus 10 on which a magnetic recording tape 11 is wound from a reel 12 onto a reel 13 by means of conventional machinery (not shown). A color video signal recorded on the tape 11 is reproduced by means of playback head 15.

In practice, it is customary to keep the required velocity of the tape 11 within feasible limits by having the playback head 15, or a plurality of playback heads, execute a transverse or slant-track scan relative on the tape 11. Means for accomplishing these and other advantageous scanning patterns are well known in the art and are thus not illustrated herein.

It is also generally known to be advantageous to subject composite video signals to a selected modulation prior to the recording thereof so as to improve the quality of the reproduced video signal. So far, frequency modulation has been most widely used for this purpose, but nothing mentioned or indicated herein is intended to preclude the use of any other suitable kind of modulation or direct recording. The signal played back by means of the head 15 is applied to a processing stage 17 which includes amplifier, demodulator and related means of the type customarily employed to render a reproduced composite video signal suitable for further processing. It should be understood in this connection that the demodulator in block 17 does not resolve the composite video signal into its components, but rather demodulates such signal from the FM carrier or other modulation used for recording purposes as just mentioned.

The played-back video signal, demodulated from its recording carrier or modulation, is applied to a point 18 and from there to two branches 20 and 21. The branch 20 may be termed "luminance branch" while the branch 25 may be called "chrominance branch."

As suggested by this terminology, the branch 20 includes low-pass filter means 23 which extract the luminance component from the composite video signal, or at least a major portion of such luminance component. By way of example, the low-pass filter means included in block 23 may have a cutoff frequency of about 3 MHz. The block 23 may also include time delay means which compensate for delays occurring in the chrominance branch 21.

The branch 21 includes filter means 25 which extract the chrominance component, or at least a major portion of such component, from the composite video signal occurring at point 18. By way of example, the filtering means 25 may include a band-pass filter having a range of about 1 MHz between about 3 MHz and 4 MHz. If desired, the filter means 25 may alternatively include high-pass filter means having a lower cutoff frequency of about 3 MHz. In practice, the choice of a high-pass filter in lieu of band-pass filter means may be more advantageous, since relative phase-versus-frequency shifts in the two branches 20 and 21 are reduced if the filter means 23 and 25 are of a complementary type. Also, the advantageous possibility arises that the expensive delay line in block 23 may be replaced by a simple replica of the filter 29 in the chrominance branch 21. The fact that a high-pass filter generally does not cut off frequencies above the band here of interest is not generally detrimental, as long as the recorder 10 displays itself a limited bandwidth.

The extracted color signal is applied to a mixer or modulator 27. It will be realized in this connection that factors such as flutter and wow in the recording and playback processes, shrinking and elongations of the tape 11, and spacing irregularities between the recording head and the tape or the playback head 15 and the tape 11, reflect themselves in the form of angular degradations in the chrominance signal applied to the modulator 27. These degradations, to the extent they are of relevance to the subject discussion, are herein broadly referred to as angular errors.

For present purposes, the frequency or phase of the degraded color signal is designated as $f_x$ which may be defined as $$f_x = f_r\,(1+\Delta)$$

Wherein $f_r$ is the standard color subcarrier frequency (approximately 3.58 MHz in the NTSC system) which was present in the signal at the time of recording, while $\Delta$ designates angular errors (typically time varying) in the played-back signal.

In addition to the signal designated by $f_x$, a reference signal designated by $(f_c+f_x)$ is applied to a second input of the modulator 27, wherein $f_c$ is a locally generated stable reference signal of frequency equal to the standard NSTC color reference carrier frequency (approximately 3.58 MHz). This modulator heterodynes the signal $(f_c+f_x)$ with the signal $f_x$. Among the products of such heterodyning or modulation step, there is a component which represents the frequency difference between the latter two signals. A low-pass filter 29 extracts such frequency-difference component from the output of the modulator 27.

If the $f_x$ term in the $(f_c+f_x)$ reference signal corresponds in frequency exactly to $f_r\,(1+\Delta)$, then the latter frequency-difference component just mentioned will be at the frequency $f_c$. Fixed or slowly varying phase discrepancies between the $f_x$ term in the $(f_c+f_x)$ reference signal and the $f_x$ input of the modulator will generally not result in improper system operation, since the relative phase of the color reference burst and the modulated chrominance information will be preserved.

The extracted component is applied to a point 72 and thence to a modulator 73 which serves to reestablish the correct angular relationship between the burst and other chrominance vectors which was reversed by the heterodyning process in the modulator 27. The modulator 73 is driven by a reference signal of $2f_c$ which is provided by a factor-of-two multiplier 74 connected to the oscillator 40. A low-pass filter 75 is connected to the output of the modulator 73 to extract the lower frequency component $(2f_c-f_c)=f_c$ from the modulation product.

The component extracted by the filter 75 may be viewed as a chrominance signal the modulation components of which are disposed about a substantially stable carrier, while phase and amplitude interrelationships of such modulation components are retained. It is understood in this connection that the stable carrier itself is suppressed in accordance with standard practice. In the instant apparatus, this carrier suppression is effected in the modulator 27. This modulator preferably is of a doubly balanced type to assure adequate suppression of components disposed about $f_x$. The nature, construction and operation of doubly balanced modulators are well known in the electronics art.

The generation of the above mentioned $(f_c+f_x)$ reference signal will now be described. In the illustrated embodiment, this reference signal is generated in a phase-lock servo loop 31 which includes a burst separator 32, a phase detector 33, a loop filter 34, an adding network or amplifier 26, a voltage-controlled oscillator 35, a modulator or mixer 36, and the above-mentioned modulator 27 and low-pass filter 29 included in the signal processing means 30.

The burst separator 32 may be of a conventional type and is gated by a burst flag generator 38 which responds to the horizontal synchronization pulses occurring at the output of the low-pass filter 23 in the luminance branch 20. If desired, the burst separator 32 may be connected to the output of the filter. The burst separator 32 derives color synchronization or color burst signals from the chrominance signal which has been processed by the processing means 30 and which appears at the output of the low-pass filter 29. This derived burst information is applied to one input of a phase detector 33 which compares the phase of the derived burst information with that of a stable reference signal which is produced by a local oscillator 40 and which preferably oscillates at the above mentioned nominal frequency $f_c$.

Angular errors in the processed chrominance signal passing through the low-pass filter 29 will also affect the burst information present therein, so that the phase detector 33 will produce a phase error signal $\epsilon_{ph}$ which is applied to the control input of the voltage-controlled oscillator 35 through an adding network or amplifier 26 to be discussed below. In accordance with conventional practice, the phase-lock loop 31 includes a loop filter 34 which imposes a desired measure of stability on the loop and dampens hunting tendencies and objectionable discontinuities.

The voltage-controlled oscillator 35 is constructed to provide an output signal which may be designated by $f_x$ and which constitutes the $f_x$ component in the reference signal $(f_c+f_x)$ applied to the modulator 27 and defined above. The phase of the $f_x$ output signal of the oscillator 35 varies in response to the error signal $\epsilon_{ph}$ so as to follow angular error variations of the color bursts. The modulator 36 heterodynes this $f_x$ output signal with a stable $f_c$ signal provided by the local oscillator 40, and includes conventional filter means (not shown) for extracting the $(f_c+f_x)$ component from its modulation product. The latter signal is applied to the modulator 27 as a reference signal to participate in the processing of the chrominance signal as described above.

Since the servo loop 31 extends through the point 72 and the modulator 27, it is easily seen that it provides an automatically operating error correction function which closely follows error variations in the played-back color video signal applied through the point 18 and the filter 25 to the modulator 27. This is also apparent if the burst separator 32, phase detector 33 and loop filter 34 are considered as being connected in a feedback path for the signal processing means 30.

The phase-lock loop 31 adjusts the $f_x$ term in the $(f_c+f_x)$ reference signal to $f_r\,(1+\Delta)$ in conformity to the above-mentioned desideratum and with a sufficient speed of response to variations.

It will now be recognized that the phase-lock loop 31 which functionally corresponds to the servo loop of the same designation in the above mentioned copending application Ser. No. 873,284, entitled "Signal Correcting Apparatus," filed Nov. 3, 1969, by Bert H. Dann, provides an effective means for correcting effects of angular errors in a simple manner and with relatively uncomplicated components.

In some applications problems may however arise from the fact that the error signal $\epsilon_{ph}$ is derived from color burst information. As mentioned above, color burst information is generally accompanied by strong sideband components separated from the burst frequency $f_b$ by integral multiples of the horizontal synchronization rate $f_h$ and brought about by the fact that the burst represents a carrier at frequency $f_b$ which is ordinarily suppressed, but is keyed on for short intervals at the rate $f_h$. In practice, these undesired sideband components may cause the voltage-controlled oscillator 35 to lock in on a faulty frequency so that the reference signals $f_x$ and $(f_c+f_x)$ do not correspond to their desired value.

The subject invention as embodied in the illustrated apparatus provides a frequency control loop 45 which prevents the voltage-controlled oscillator 35 from locking in or undesired sideband components and which reduces the output frequency tolerance requirements on such voltage-controlled oscillator. As a further benefit, the frequency control loop 45 accelerates the acquisition of phase-locking by the servo loop 31 and causes the voltage-controlled oscillator output to be slewed to accommodate relatively large changes in burst frequency which occur during stop-motion operation of the tape recorder 10 on playback. As is well known, stop-motion operation is employed to show selected frames of a video program in stop motion.

The loop 45 includes frequency detector means 47 which in the illustrated embodiment, are in the form of a quadricorrelator of the type described by Richman in "Color-Carrier Reference Phase Synchronization Accuracy in NTSC Color Television," Proceedings IRE, Jan. 1954, pp. 106–33. Broadly speaking, the phase detector means 47 provide a frequency control signal $\epsilon_f$ which is indicative of the frequency difference between a signal derived from the horizontal synchronization information and a signal derived from the output of the voltage-controlled oscillator 35.

To provide for a comparison between the latter two signals, circuit means are employed which translate the frequencies of both signals to mutually comparable values.

More specifically, a frequency multiplier 48 is connected to the burst flag generator 38 to provide at a terminal 50 a signal having a frequency of five times the horizontal synchronization rate. Simultaneously, the output signal of the voltage-controlled oscillator 35 is doubled in a double and clipper circuit 52. A 91:1 dividing network 53 divides this doubled $f_x$ signal by a divisor of 91, to provide at a terminal 56 a signal having a frequency of $2f_x/91$. The choice of this frequency division is dictated by the fact that the nominal color subcarrier in the NTSC system has a frequency which is exactly 455 times the horizontal half-line frequency.

While the divider 53 may appear to complicate the circuitry it should be understood that it may conveniently be realized by binary flip-flop stages which are now available at relatively low cost in integrated circuit form.

The frequency detector 47 includes two synchronous detector stages 58 and 59. The detector stage 59 has a −90° phase-shift network 60 associated therewith, so that it operates in quadrature to the detector 58. The $5f_h$ signal at the terminal 50 is applied to corresponding first inputs of the detectors 58 and 59 while the $2f_x/91$ signal at the terminal 56 is applied to a second input of the detector 58 and, through the phase-shifting network 60, through a corresponding second input of the detector 59. The two detectors 58 and 59, which may be of a conventional type, produce two beat notes which are in quadrature to each other.

A beat note provided by the detector 58 is extracted from the output thereof by a band-pass filter 62 which is designed to cut off low-frequency noise and undesired spectra above one-half horizontal line frequency, and which applies the extracted beat note to one input of a further detector 65. A beat note produced by the detector 59 is extracted from the output thereof by a band-pass filter 63 which may be of the same design as the filter 62. The beat note provided by the band-pass filter 63 is subjected to the operation of a differentiating network 66 which imposes a phase shift of 90° on such beat note and which converts such beat note to a beat note having an amplitude which is proportional to its frequency and which follows the same angular function as the beat note extracted by the band-pass filter 62, as illustrated in FIG. 13 of the above-mentioned Richman article. Such converted beat note is applied to the second input of a cross-multiplying detector 65 which, as described by Richman, provides an output signal that contains a direct-current term proportional and polarized according to the frequency difference between the detector input signals applied at the terminals 50 and 56.

This direct-current term is extracted by a low-pass filter 67 to provide the above mentioned frequency control signal $\epsilon_f$ in the adding network 26. The resulting phase and frequency control signal is applied to the input of the voltage-controlled oscillator 35. The error signal $\epsilon_f$ controls the variable oscillator 35 along with the error signal $\epsilon_{ph}$. More specifically, the signal $\epsilon_f$ operates to prevent the voltage-controlled oscillator 35 from locking in on an undesired sideband component. The error signal $\epsilon_{ph}$ thereupon operates to vary the phase of the $f_x$ output signal of the voltage-controlled oscillator 35 in accordance with angular errors in the color burst.

The illustrated apparatus is thus characterized by a phase-lock loop 31 and a frequency control loop 45, both of which share, or extend through, the phase-controlled oscillator 35. It will not be recognized that the subject invention provides high-precision means for providing a reference signal which varies in phase in accordance with angular errors in a color video signal accompanied by a horizontal synchronization signal.

Reverting to the illustrated signal-correcting system, it will be noted that an adding network or amplifier 69 recombines the luminance component from the block 23 with the processed chrominance signal from the filter 75 to provide a composite color video signal at the system output 70. Such composite signal may then be utilized in a conventional manner, such as by application to the video signal processing portion of a color television receiver or to other viewing or signal-processing equipment, as may be desired. Alternatively, the output signal at 70 may be modulated on a suitable carrier and may thereupon be applied to antenna terminals of a color television set or to other easily accessible parts thereof.

In practice, the circuit elements included in the frequency detector or quadricorrelator 47 need not be of the same high-grade design or quality as if such quadricorrelator were employed to process video information. Nevertheless, the quadricorrelator 47 affords a high degree of noise discrimination and provides an efficient frequency difference detector which is not subject to tuning errors.

Other modifications within the spirit and scope of the invention will become apparent or suggest themselves to those skilled in the art. For instance, the automatic frequency control system herein disclosed may be employed in color video processing systems other than the heterodyning system shown in the drawing.

We claim:

1. Apparatus for providing a reference signal varying in phase in accordance with angular errors in a color video signal accompanied by a color reference burst and a horizontal synchronization signal, said color reference burst including a number of sideband components stemming from a keying of said color reference burst at horizontal synchronization rate, comprising in combination:

a. first means for providing an output signal and for varying the phase of said output signal;

b. second means connected to said first means for limiting frequency variations of said output signal to a range located between upper sideband components and lower sideband components of said number of sideband components of the color reference burst; and c. third means connected to said first means for causing said first means to vary the phase of said output signal within said range in accordance with said angular errors, whereby said output signal provides said reference signal.

2. Apparatus as claimed in claim 1, wherein said first means and said second means are interconnected to provide frequency control loop means.

3. Apparatus as claimed in claim 2, wherein said second means in said frequency control loop means include:

a. means for detecting frequency differences between said output signal and a signal derived from said horizontal synchronization signal; and b. means connected to said detecting means and to said first means for limiting frequency variations of said output signal to said range in response to said detected frequency differences.

4. Apparatus as claimed in claim 3, wherein said detecting means include quadricorrelator means.

5. Apparatus for providing a reference signal varying in phase in accordance with angular errors in a color video signal accompanied by a color reference burst and a horizontal synchronization signal, said color reference burst including a number of sideband components stemming from a keying of said color reference burst at horizontal synchronization rate, comprising in combination:

a. first means for providing an output signal and for varying the phase of said output signal;

b. second means for deriving from said horizontal synchronization signal a signal indicative of the horizontal synchronization rate;

c. frequency control loop means including said first means and being connected to said second means for limiting, in response to said output signal and said horizontal synchronization rate signal, frequency variations of said output signal to a range located between upper sideband components and lower sideband components of said number of sideband components of the color reference burst; and d. phase-lock loop means including said first means for causing said first means to vary the phase of said output signal within said range in accordance with said angular errors, whereby said output signal provides said reference signal.

6. Apparatus as claimed in claim 5, wherein said frequency control loop means include means for detecting frequency differences between said output signal and said horizontal synchronization rate signal and means connected between said detecting means and said first means for limiting frequency variations of said output signal to said range in response to said detected frequency differences.

7. Apparatus as claimed in claim 6, wherein said detecting means include quadricorrelator means.

* * * * *